Feb. 2, 1960 F. M. SCHWEINBERG 2,923,255
COMBINED CAR STOP AND BUMPER
Filed Oct. 27, 1958 7 Sheets-Sheet 1

INVENTOR.
FRED M. SCHWEINBERG.
BY Thomas J. P. O'Brien
HIS ATTORNEY.

Feb. 2, 1960　　　F. M. SCHWEINBERG　　　2,923,255
COMBINED CAR STOP AND BUMPER
Filed Oct. 27, 1958　　　　　　　　　　　　7 Sheets-Sheet 2

Fig. 4.

INVENTOR.
FRED M. SCHWEINBERG
BY
Thomas J. D. O'Brien
his
ATTORNEY.

Feb. 2, 1960

F. M. SCHWEINBERG 2,923,255

COMBINED CAR STOP AND BUMPER

Filed Oct. 27, 1958

INVENTOR.
FRED M. SCHWEINBERG.
BY Thomas J. P. O'Brien.
his ATTORNEY.

Feb. 2, 1960

F. M. SCHWEINBERG 2,923,255

COMBINED CAR STOP AND BUMPER

Filed Oct. 27, 1958

INVENTOR.
FRED M. SCHWEINBERG.
BY Thomas J. P. O'Brien.
his ATTORNEY.

United States Patent Office 2,923,255
Patented Feb. 2, 1960

2,923,255

COMBINED CAR STOP AND BUMPER

Fred M. Schweinberg, Bridgeville, Pa., assignor to Koppers Company, Inc., a corporation of Delaware Application October 27, 1958, Serial No. 769,620

15 Claims. (Cl. 104—257)

This invention relates to a combined car stop and bumper for railroad cars and is primarily designed as a safety device to prevent railroad cars from accidentally drifting out of a storage or unloading area where it is not feasible to utilize a conventional bumper post permanently set to the substructure below and between the rails, or a conventional car retarder for pressing the sides of the car wheel flanges against the sides of the top of the rails, and a conventional car stop clamped or gripping the rails is insufficient to hold a loaded drifting car.

Individual hand brakes mounted on the cars are normally relied on for this purpose but occasionally a car may break loose and drift, endangering human life and property. The device of the present invention is one that can be located at the entrance to such a storage track or siding and is a positive stop for runaway cars which, in these situations, would not be traveling faster than 3 m.p.h.

A particular object and advantage of the invention is the provision of bumper distribution parts for distribution of the stress of impact from the moving car over to opposite sides of the rails and transmitting the thrust down to the subadjacent track supports as well as a car stop part for thrust down through the top of the rails, whereby the subadjacent track supports provide the mass for holding the car or cars and exert an oppositely acting thrust on the rails counter to the thrust of the car stop part thus equalizing the thrust on the rails by the turning movement of the car stop thereon.

In this manner, the parts may be made of relatively small, inexpensive, and easily manipulated with utmost safety.

Accordingly, the present invention provides for the purpose, a car wheel engaging stop element adapted to overlie a track in abutting relation with the track and with a car wheel periphery on the track, and a bumper element for arresting lengthwise movement of said stop element along said track comprising stress distributing parts integral with opposite sides of said stop element and lying on opposite sides of the track, and movable with the stop element into and out of overlaying relation with said track. For transmitting car thrusts from the stress distributing parts to the subadjacent track support, two sets of upright thrust transmitting posts are provided for the opposite sides of the track with the post of each set extending from a level above the bottom of the track downwardly along the two sides of the track, the posts of one set also extend down along one side of one tie, of a pair of side-by-side transverse ties, subadjacent the track and are anchorable below the track, and the posts of the other set also extend down along one side of the other tie, of said pair of ties, and are anchorable below the track, with said stress distributing parts between the upper parts of the posts of the two sets of posts. To distribute the car thrusts from the posts along the subadjacent track supports, two sets of longitudinally extending thrust transmitting members are then provided for the two sets of posts. The thrust transmitting members of one set of posts extend from those posts, at the region thereof alongside the track, over said one tie of the pair and thence terminating in a portion projecting downwardly along the opposite side of said tie for anchoring to a subadjacent track support including said opposite side of the tie and the confronting side of a next subadjacent tie along that side of the pair of ties, and the thrust transmitting members of the other set of posts extend from those posts, at the region thereof alongside the track, over said other tie of the pair and thence terminating in a portion projecting downwardly along the opposite side of said other tie of a pair for anchoring to a subadjacent track support including said opposite side of said other tie of the pair and the confronting side of the next subadjacent tie along that side of the pair of ties.

In operation the posts and the longitudinally extending thrust transmitting members are anchored to longitudinal stringers subadjacent the ties as well as to the sides of metal ties. In such case the entire substructure is thus brought into play to restrain the movement and weight of loaded cars on the track. The invention however is not limited in all its aspects to the use of these stringers. Much of the advantage of the invention is utilizable by interconnecting the ties by separate members between each two ties and anchoring to such members, as well as by having the lower portions of the longitudinal thrust transmitting members constituted of heavy rigidifying portions to interconnect the ties and form the equivalent of the longitudinal stringers. Hence, the scope of the invention is not limited in all its aspects to the embodiment hereinafter shown and described for purpose of illustrating the invention.

Other objects and advantages of the invention will be apparent as it is better understood from the following description when considered in connection with the accompanying drawings illustrating the best mode of practicing the invention:

The same reference numerals are used for like parts in each of the several views.

Figure 8:
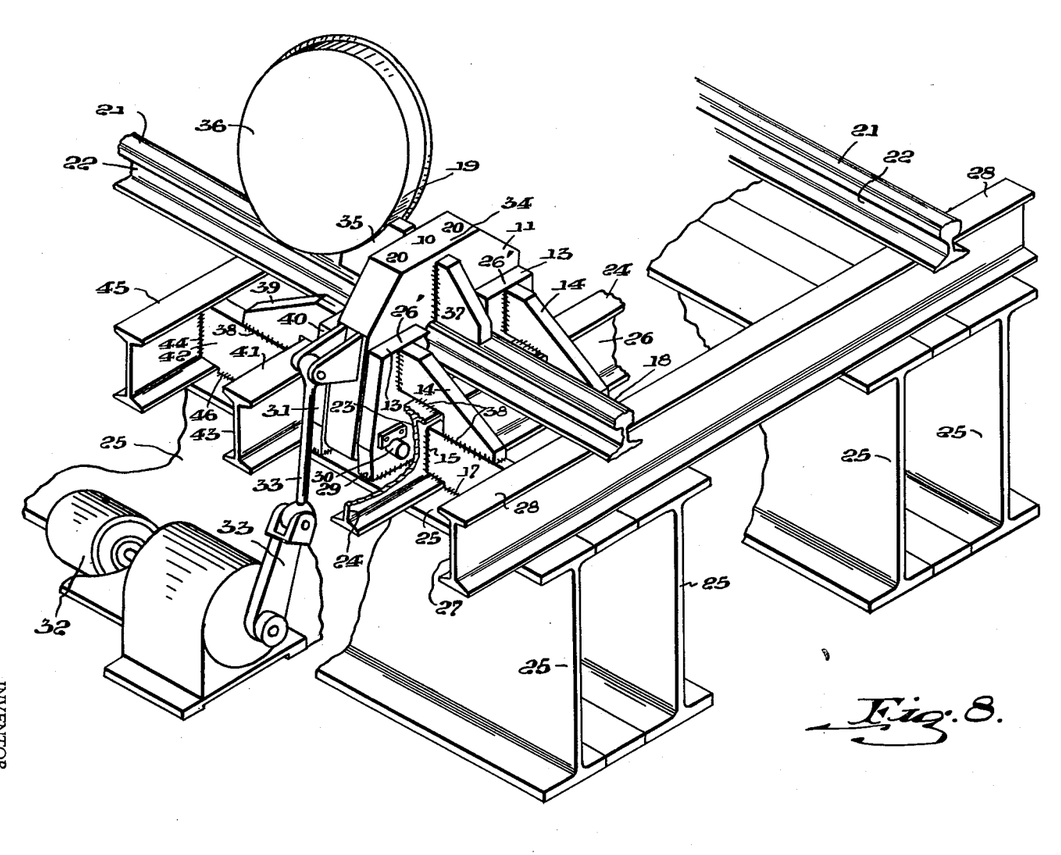
Figure 8 is an isometric view of one of the devices in place for operation.

Referring to the drawings, the improved device comprises, Figure 8, a car wheel engaging stop element 10 adapted to overlie a track 18 in abutting relation with the track and a car wheel periphery 19 on the track, and a bumper element for arresting movement of said stop element along the length of said track comprising stress distributing parts 11 integral with opposite sides 20 of said stop element 10 to lie on opposite sides of the track 18, upright thrust transmitting posts 13 for opposite sides 22 of said track 18 extending from slightly above the level of the top 21 of the track, so as to be at a level below the axis of the wheels to be stopped on said track, downwardly along the side 22 of the track and along the side 23 of a transversely extending subadjacent tie 24 and anchorable at 29 below the track 18 for transmitting car thrusts from the stop element 10 to the longitudinal stringer 25 forming a part of the subadjacent track support, and longitudinally extending thrust transmitting members 14 extending from the portions 26' of the posts 13 alongside the track over said subadjacent tie 24 and thence downwardly along the opposite side 26 of said tie 24 for anchoring at 15 to that side 26 of the tie 24 at 16 to the confronting side 27 of a next subadjacent tie 28 as well as at 17 to the subadjacent stringers 25 forming a part of the subadjacent track supports, to distribute the car thrust from the stop element along the subadjacent track supports.

Figure 1:
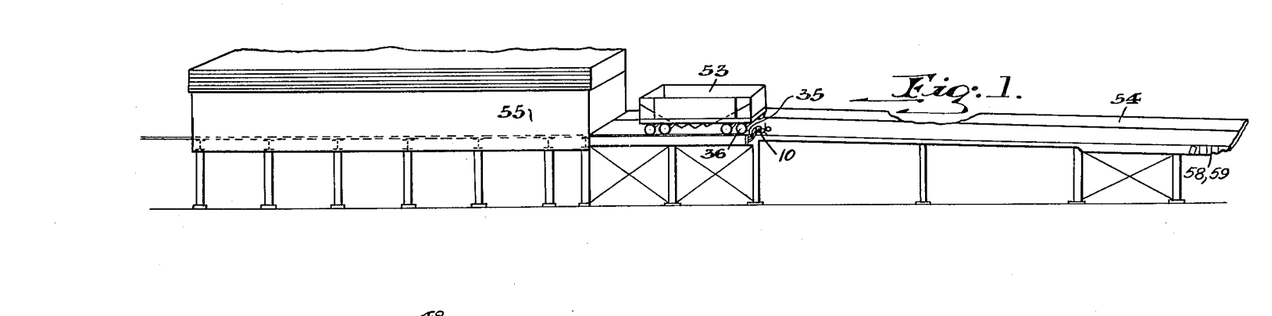
Figure 1 is an elevational diagrammatic view of a charging station with a railway gondola car being held in position by the combined stops and bumper of my invention, with pneumatic controls.
Figure 7:
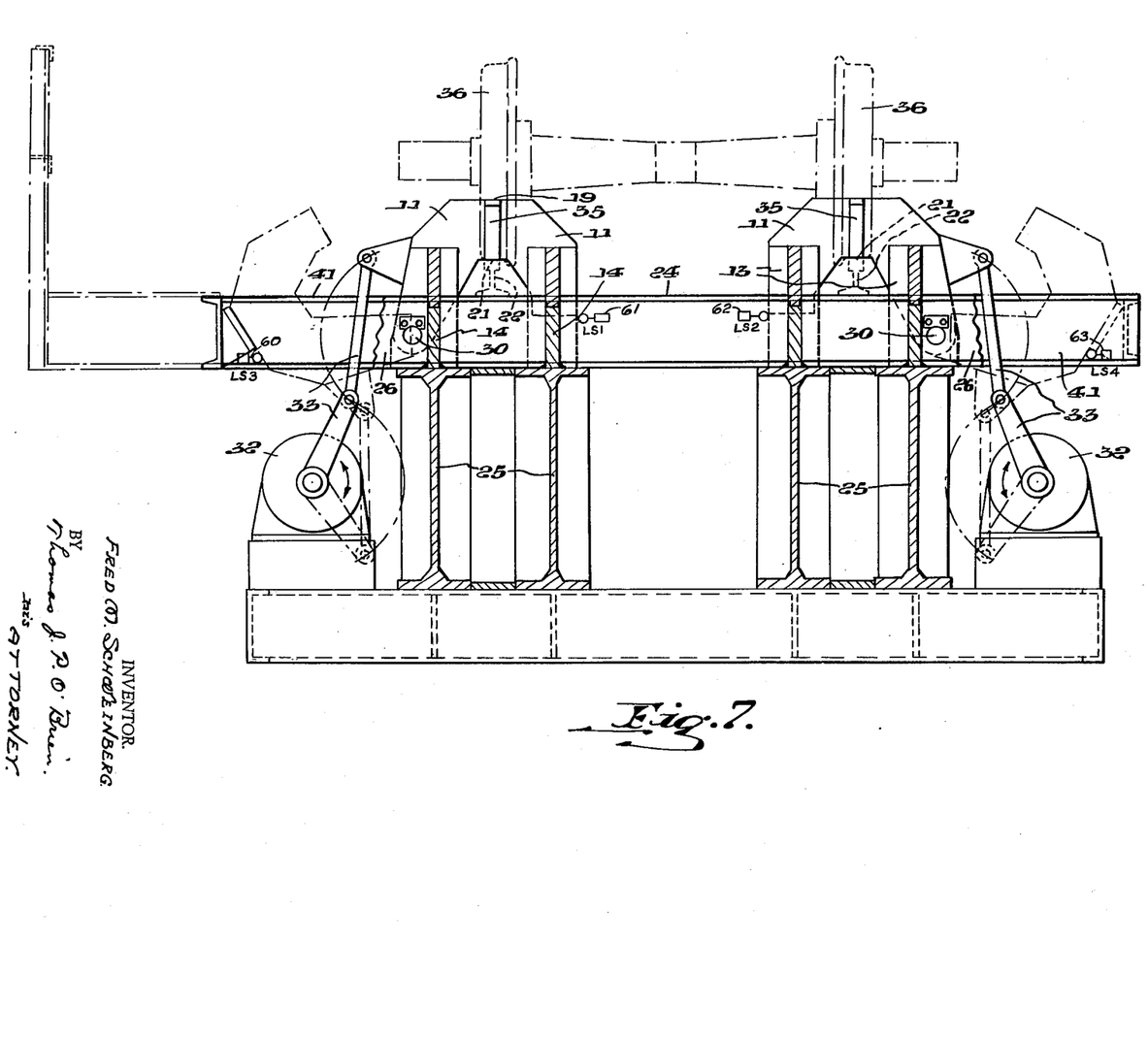

The stop element 10 and integral stress distributing parts 11, are pivotally mounted at 30 between two posts 13, 31 of two sets of posts 13—13 and 31—31 for movement into and out of the way of the track top 21, and are automatically movable as aforesaid by an electrical switch 58, 59, Fig. 1, actuated by an approaching locomotive, through an electric motor 32 and linkage 33 with the stop element 10 and stress parts 11 and timer in the form of limit switches 60, 61, 62, 63, Fig. 7, to stop the motor after the stop has opened and has closed.

The stop element 10, as shown, comprises a single unitary whole with a central body portion 34 and two opposite longitudinal extensions, one 35 to conform with the periphery 19 of a car wheel 36 on one side, and the other 37 complemental to the extension 35 on the opposite side of the central body 34, both of which engage the top 21 of the track when the periphery 19 of a wheel abuts the stop extension 35. The parts are welded as conventionally indicated at 38, and the thrust of the wheel 36 against the stop 10 tends to set up a turning moment in the central body 34 and its stress distributing parts 11, causing a reverse thrust on the two posts 31. To counteract the thrust in that direction, these two posts 31 are also provided with a set of longitudinally extending thrust transmitting members 39 extending from the portions 40 of those posts 31, at the region thereof alongside the track, over the other tie 41 of the pair of side by side ties 24, 41, and thence terminating in a portion 42 projecting downwardly along the opposite side 43 of said other tie 41 of the pair, for anchoring to a subadjacent track support including said opposite side 43 of said other tie 41 of the pair and the confronting side 44 of the next subadjacent tie 45 along that side of the pair of ties 24, 41, and as well as at 46 to the subadjacent stringers 25 to distribute the reverse thrusts from the stop element 10 along the subadjacent track supports.

Figure 2:
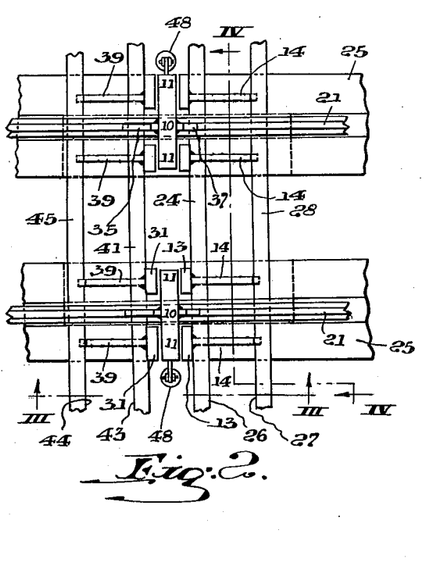
Figure 2 is a fragmentary plan view of Figure 1.
Figure 3:
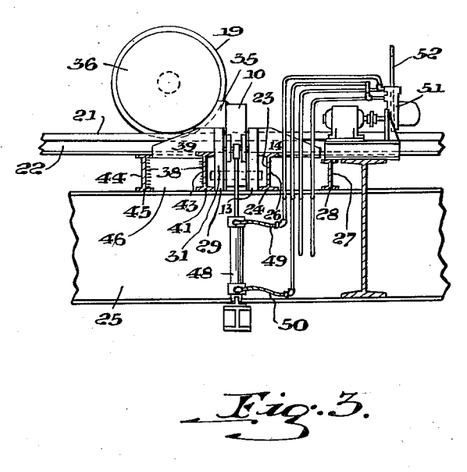
Figure 3 is a front elevational view taken on line III—III of Figure 2.
Figure 4:
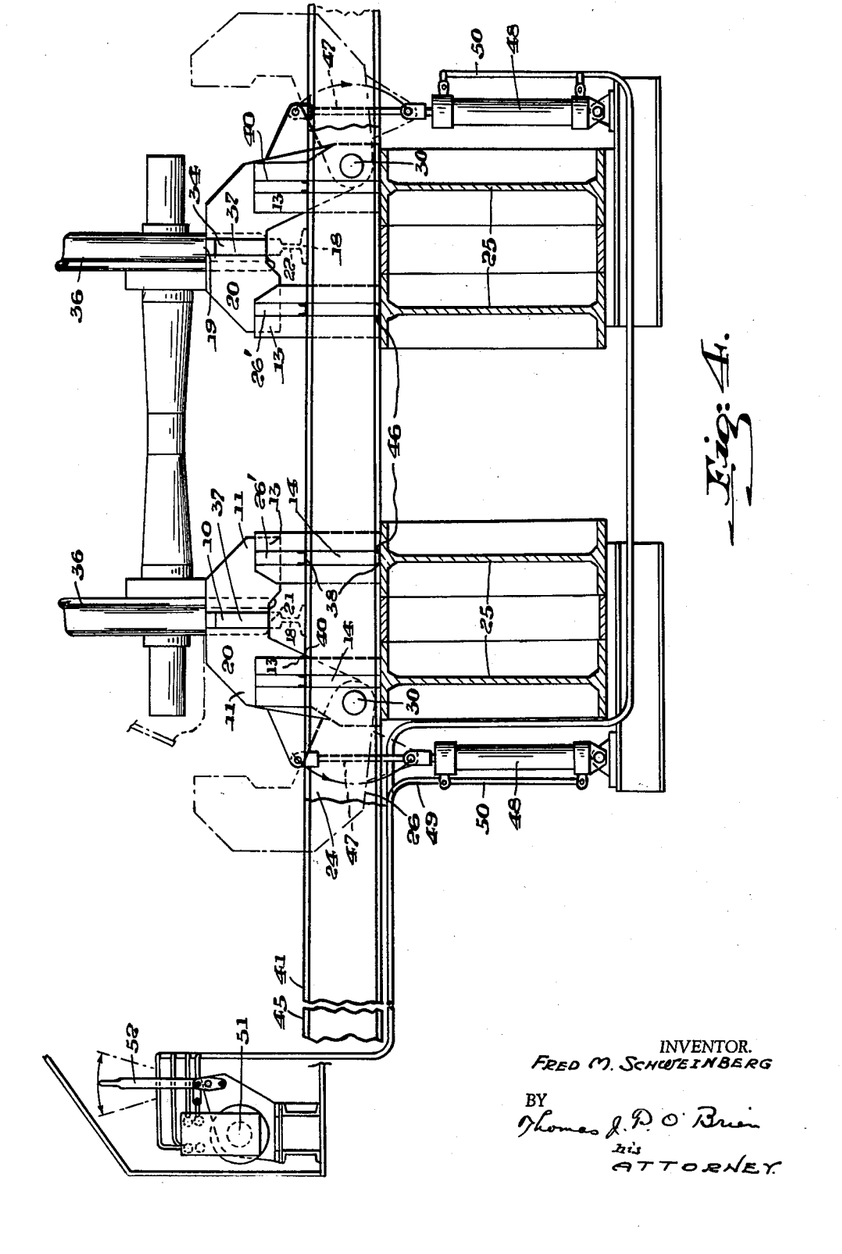
Figure 4 is a side elevational view taken on line IV—IV of Figure 2.
Figure 5:
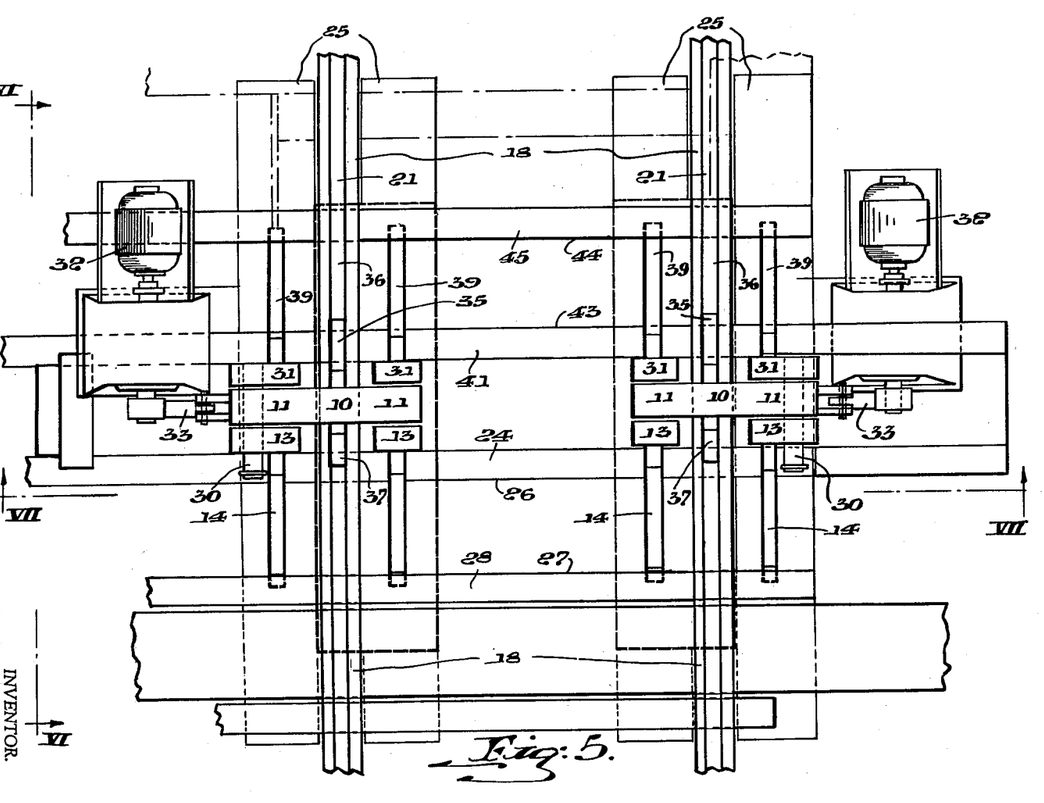
Figure 5 is a view similar to Figure 1 but with mechanical means instead of pneumatic for controlling car stops.
Figure 6:
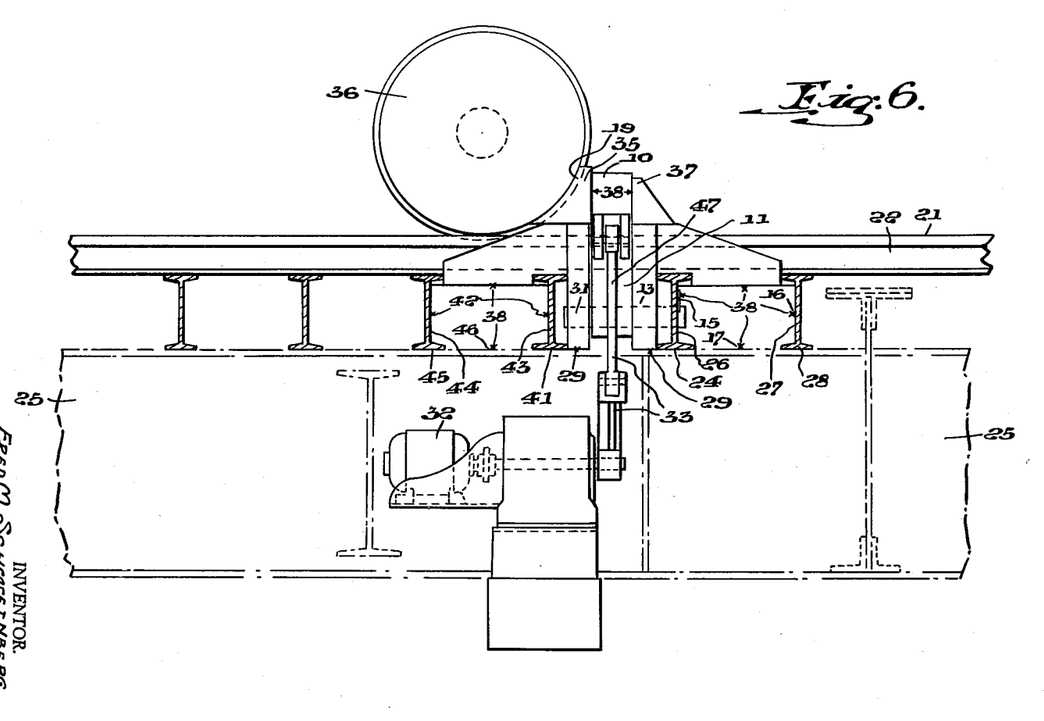
Figures 6 and 7 are front and side elevational views and taken respectively on lines VI—VI and VII—VII of Figure 5.

In operation, the stop 10 and the integral stress distributing parts 11 are manually movable as a unit into and out of the pathway of a car on the tracks 18. The device is generally used as a pair, one for each rail of a pair to engage two wheels of a car on the trackway. These devices are also mechanically operable as in Figures 2 to 4 by hydraulic means as well as by means of an electric motor as shown and described as to Figures 5 to 8.

For hydraulic operation, like in manual or electric motor operation, the stops 10 rotate approximately 120° about shafts 30 over the rails and drop into the slots between the two sets of posts 13, 31, both of which are anchored to the stringers 25. These posts are supported by the extensions 14 and 42 and their weldments to the track supporting structure in resisting the movement of the cars on the track.

For hydraulic operation piston rod 47, connected to the stop 10, is operated by hydraulic fluid pressure in cylinder 48 through lines 49, 50, and pumping unit 51, through manual operation of lever 52.

For automatic electric operation, the operation of the car stops 10 is always initiated by (Fig. 1) the rail contactors 58, 59, and stopped by (Fig. 7) limit switches 60, 61, 62, 63.

The rail contactors 58, 59 are located at the bottom of the ramp or trestle 54, Fig. 1, at a distance from the car stops 10 equal to or greater than the distance from the car stops 10 to the end 64 of the storage track 54.

The rail contactor 58 is located ahead of the other rail contactor 59 with the spacing between them so set that when approaching the car stops, the No. 1 rail contactor 58 is operated first, and a short time later the No. 2 rail contactor 59 is operated.

Figure 9:
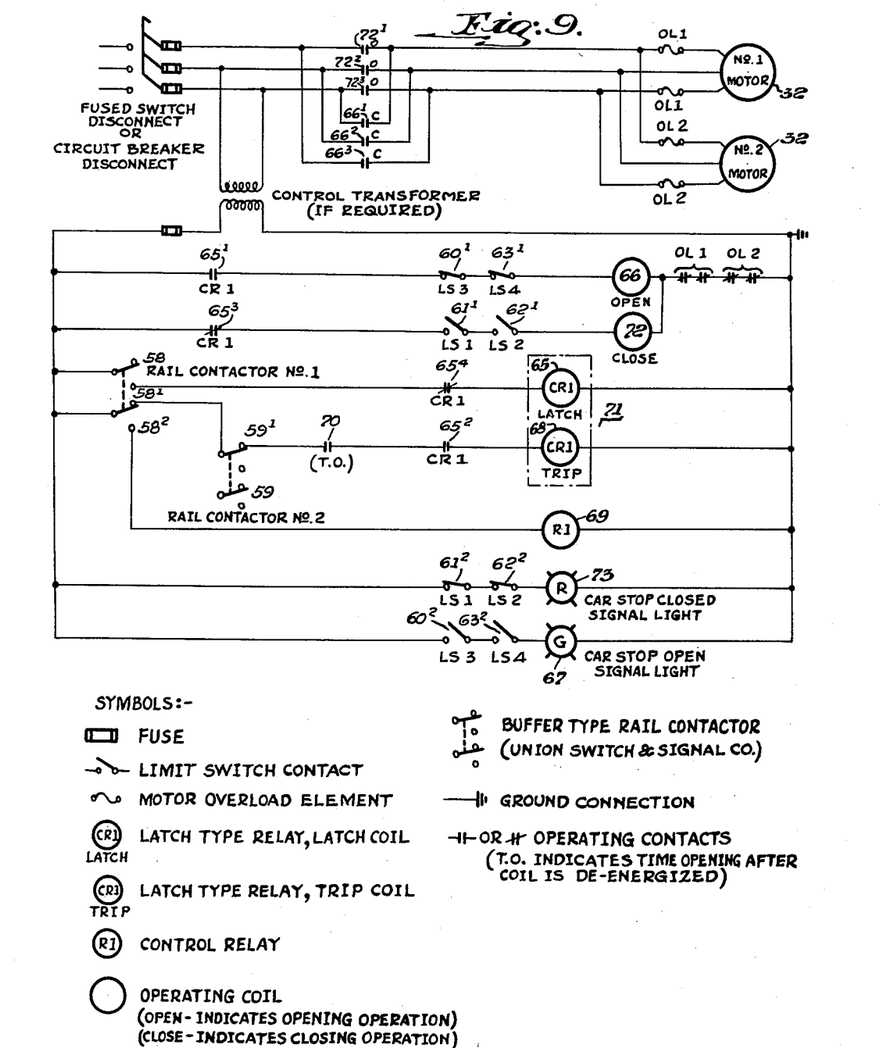
Figure 9 is a diagrammatic view of a conventional electrical system for operation with the car stops.

The elementary diagram Fig. 9 shows the car stops 10 in the closed position. For the purpose of this description of operation of the car stops, it is assumed that an engine with cars is approaching the ramp 54.

As the first wheel of the first car passes over No. 1 rail contactor 58, it closes its contacts $58^1$ and $58^2$, thereby energizing CR1 latch coil 65 of the latch type relay generally indicated as 71, closing the normally open contacts $65^1$ and $65^2$ and opening the normally closed contacts $65^3$ and $65^4$. As this happens, a circuit is completed to the "open" contactor 66 through CR1 contact $65^1$, LS3 contact $60^1$, and LS4 contact $63^1$. The "open" contactor 66 being energized, closes its normally open contacts $66^1$, $66^2$, $66^3$, placing the two motors 32, 32 across the line. The motors will remain across the line until the car stops 10 are open, at which time limit switch contacts $60^1$ and $63^1$ will open, de-energizing the "open" contactor 66, thus stopping the two motors 32. At the same time, contacts $60^2$ and $63^2$ of limit switches 60 and 63, close, energizing a "green" signal light 67, indicating "car stop open."

A second contact $58^1$ of No. 1 rail contactor 58 is also operated, opening the circuit to the CR1 latch type relay trip coil 68 and closing the circuit to R1 control relay 69. As the second No. 2 rail contactor 59 is operated by the wheels 36 of the cars passing over it, it breaks the circuit to CR1 latch type relay trip coil 68. The CR1 latch type relay trip coil 68 will not be energized. Therefore, the contacts $65^1$, $65^2$, $65^3$, $65^4$ shall remain in the latch position.

Whenever all wheels 32 have passed over the two rail contactors 58, 59, the rail contactors return to their normal position, thereby de-energizing R1 control relay 69. The normally open contact 70 of R1 control relay, being time opening after the R1 coil 69 is de-energized, will open an instant after No. 1 rail contactor 58 returns to its normal position, but before No. 2 rail contactor 59 returns to its normal position, and, therefore, the latch relay 71 will remain in its latched position and the car stops 10 remain in the open position.

Whenever the engine with its cars goes down the ramp 54, No. 2 rail contactor 59 is operated first, thus setting up the circuit for trip of the latch type relay 71. Next, as the engine moves further down the ramp No. 1 rail contactor 58 is operated, energizing R1 control relay 69 and closing R1 normally open contact 70. The circuits remain as they are until such time as the last wheel 36 passes over No. 2 contactor 59, at which time the No. 2 rail contactor 59 resets to its normal position. Then, as the last wheel of the last car passes over No. 1 rail contactor 58, it resets to its normal position. As this happens, the circuit to CR1 trip coil 68 is complete through No. 1 rail contactor $58^2$, No. 2 rail contactor $59^1$, R1 contact 70 (which is time opening after R1 coil 69 is de-energized) and CR1 contact $65^2$ and CR1 relay 68 is tripped.

As CR1 relay 68 is tripped, its contacts $65^1$, $65^2$, $65^3$, $65^4$ reset to their normal position and the circuit to close the car stops 10 is complete. The "close" coil 72 is energized through CR1 contact $65^3$, LS1 contact $61^1$ and LS2 contact $62^2$ (LS2 and LS1 were closed as the car stops began to open). With the "close" coil 72 energized, its contacts $72^2$, $72^3$ close, energizing the motors 32, and the car stops 10 begin to close. The closing motion of the car stops 10 is stopped by the opening of LS1 and LS2 limit switch contacts $61^1$, $62^1$. At the same time, another set of contacts 61², 62² of (Fig. 7) LS1 and LS2 limit switches 61 and 62 close, energizing a red signal light 73 indicating "car stop closed."

The circuits are now reset ready for another engine to approach the ramp. If neither the signal light "car stop closed" 73, nor the signal light "car stop open" 67 is energized, a power failure is indicated, provided the lamps are not burned out.

The system is especially adapted for operation in steel plants where ore cars 53 are shunted along trestles 54 by a switch engine and detached therefrom alongside bins 55. Thereafter a so-called mule or jack is used to nudge the several cars in alignment with chutes for the hoppers or bins. The device is especially suited as a drift stop for such loaded cars at three miles per hour such as might occur due to some inclination from true horizontal of the trestle. The special arrangement of parts as described provides the essential lightweight structure for arresting the drift of such heavy ore cars.

The invention as hereinabove set forth is embodied in a particular form of construction but may be variously embodied within the scope of the claims hereinafter made.

I claim:

1. A combined car stop and bumper comprising: a car wheel engaging stop element adapted to overlie a track in abutting relation with the track and with a car wheel periphery on the track; and a bumper element for arresting lengthwise movement of said stop element along said track, said bumper element comprising, stress distributing parts integral with opposite sides of said stop element to lie on opposite sides of the track, and movable with said stop element into and out of overlying relation with said track, two sets of upright thrust transmitting posts for the opposite sides of the track with the post of each set extending from a level above the bottom of the track downwardly along the two sides of the track, the posts of one set also extending down along one side of one tie, of a pair of side-by-side transverse ties, subadjacent the track and anchorable below the track, and the posts of the other set also extending down along one side of the other tie, of said pair of ties, and anchorable below the track, with said stress distributing parts between the upper parts of the posts of the two sets of posts, for transmitting car thrusts from the stop element to the subadjacent track support, and two sets of longitudinally extending thrust transmitting members for the two sets of posts, the thrust transmitting members of one set of posts extending from those posts, at the region thereof alongside the track, over said one tie of the pair and thence terminating in a portion projecting downwardly along the opposite side of said tie for anchoring to a subadjacent track support including said opposite side of the tie and the confronting side of a next subadjacent tie along that side of the pair of ties, and the thrust transmitting members of the other set of posts extending from those posts, at the region thereof alongside the track, over said other tie of the pair and thence terminating in a portion projecting downwardly along the opposite side of said other tie of a pair for anchoring to a subadjacent track support including said opposite side of said other tie of the pair and the confronting side of the next subadjacent tie along that side of the pair of ties, to distribute the car thrusts from the stop element along the subadjacent track supports.

2. A combined car stop and bumper, as claimed in claim 1, and in which the stop element and integral stress distributing parts are pivotally mounted between two posts of the two sets thereof for movement into and out of the way of the track, and the stop element and said stress distributing parts are automatically movable as aforesaid by an electrical switch actuated by an approaching locomotive, through an electric motor and linkage to the stop element and stress distributing parts, with a timer to stop the motor after the stop has opened and has closed.

3. A combined car stop and bumper as claimed in claim 1, and which includes automatically operable mechanism for moving the stop element and integral stress distributing parts into and out of the way of the track.

4. A combined car stop and bumper as claimed in claim 1, and which includes stringers subadjacent the ties disposed crosswise thereof forming a part of the subadjacent track supporting structure to which the posts and the thrust transmitting members are anchored.

5. A combined car stop and bumper as claimed in claim 1, and which includes basal stringer parts subadjacent the ties and forming with the ties interconnected anchorage parts to which the posts and thrust transmitting members are anchored.

6. A combined car stop and bumper as claimed in claim 1 and in which the stop element and stress distributing parts integral therewith comprise a single unitary whole, with a central body portion having two opposite longitudinal extensions, one to conform with the periphery of a car wheel on one side, and the other complemental thereto on the opposite side of the central body and both abutting the track, and two opposite transverse stress distributing extensions, one pendant between two of the posts on one side of the track and the other on the opposite side of the central body and pendant between two posts on the other side of the track.

7. A combined car stop and bumper as claimed in claim 6, and in which the posts extend at their upper parts to terminate above the top level of the track but at a level below the level of the axis of wheels to be stopped on said track, and the pendant stress distributing extensions extend from a level above the top of the track to a level as low as the base of the track top.

8. A combined car stop and bumper comprising: a car wheel engaging stop element adapted to overlie a track in abutting relation with the track and with a car wheel periphery on the track, and a bumper element for arresting lengthwise movement of said stop element along said track comprising stress distributing parts connected with opposite sides of said stop element to lie on opposite sides of the track, and movable with said stop element into and out of overlying relation with said track, upright thrust transmitting posts for opposite sides of said track extending from a level above the bottom of the track downwardly along the side of the track and along the side of a transversely extending subadjacent tie and anchorable below the track for transmitting car thrusts from the stop element to the subadjacent track support, and longitudinally extending thrust transmitting members extending from the portions of the posts alongside the track over said subadjacent tie and thence terminating in a portion projecting downwardly along the opposite side of said tie for anchoring to a subadjacent track support including that side of the tie and the confronting side of a next subadjacent tie, to distribute the car thrust from the stop element along the subadjacent track supports.

9. A combined car stop and bumper, as claimed in claim 8, and in which the stop element and integral stress distributing parts are pivotally mounted on one of the posts for movement into and out of the way of the track, and the stop element and said stress distributing parts are automatically movable as aforesaid by an electrical switch actuated by an approaching locomotive, through an electric motor and linkage to the stop element and stress parts, with a timer to stop the motor after the stop has opened and has closed.

10. A combined car stop and bumper as claimed in claim 8, and which includes automatically operable mechanism for moving the stop element and integral stress distributing parts into and out of the way of the track.

11. A combined car stop and bumper as claimed in claim 1, and which includes stringers subadjacent the ties disposed crosswise thereof forming a part of the subadjacent track supporting structure to which the posts and the thrust transmitting members are anchored.

12. A combined car stop and bumper as claimed in claim 8, and which includes basal stringer parts subadjacent the ties and forming with the ties interconnected anchorage parts to which the posts and thrust transmitting members are anchored.

13. A combined car stop and bumper as claimed in claim 8 and in which the stop element and stress distributing parts are integral and comprise a single unitary whole, with a central body portion having two opposite longitudinal extensions, one to conform with the periphery of a car wheel on one side, and the other complemental thereto on the opposite side of the central body and both abutting the track, and two opposite transverse stress distributing extensions, one pendant alongside the post on one side of the track and the other on the opposite side of the central body and pendant alongside the post on the other side of the track.

14. A combined car stop and bumper as claimed in claim 13, and in which the posts extend at their upper parts to terminate above the top level of the track but at a level below the level of the axis of wheels to be stopped on said track, and the pendant stress distributing extensions extend from a level above the top of the track to a level as low as the base of the track top.

15. A combined car stop and bumper comprising: a car wheel engaging stop element adapted to overlie a track in abutting relation with the track and with the periphery of a car wheel on the track, and a bumper element for arresting movement of said stop element along said track comprising stress distributing parts connected with opposite sides of said stop element to lie on opposite sides of the track, upright thrust transmitting posts for opposite sides of said track extending from a level above the bottom of the track downwardly along the side of the track and along the side of a transversely extending subadjacent tie and anchorable below the track to the subadjacent track support, and longitudinally extending thrust transmitting members extending from the portions of the posts alongside the track over said subadjacent tie and thence terminating in a portion projecting downwardly along the opposite side of said tie for anchoring to subadjacent track supports including that opposite side of said tie and the confronting side of a next subadjacent tie, to distribute the car thrust from the stop element along the subadjacent track supports.

References Cited in the file of this patent

UNITED STATES PATENTS

| | | |
|---|---|---|
| 1,584,031 | Hannauer et al. | May 11, 1926 |
| 1,706,211 | Coffey | Mar. 19, 1929 |
| 1,819,017 | Drake | Aug. 18, 1931 |
| 2,821,939 | Cortese | Feb. 4, 1958 |